US00RE38746E

(19) United States
(12) Reissued Patent
Bruno

(10) Patent Number: US RE38,746 E
(45) Date of Reissued Patent: Jun. 28, 2005

(54) ASHTRAY

(75) Inventor: Robert H. Bruno, Avon, CT (US)

(73) Assignee: The Rival Company, Kansas City, MO (US)

(21) Appl. No.: 29/049,017

(22) Filed: Nov. 1, 1995

Related U.S. Patent Documents

Reissue of:
(64) Patent No.: Des. 345,437
Issued: Mar. 22, 1994
Appl. No.: 07/900,248
Filed: Jun. 17, 1992

(51) LOC (8) Cl. ..... 27-03
(52) U.S. Cl. ..... D27/105
(58) Field of Search ..... D27/105, 135, D27/127; 131/235.1, 256, 231; D3/273, 294

(56) References Cited

U.S. PATENT DOCUMENTS

| | | | | | |
|---|---|---|---|---|---|
| D156,577 | S | * | 12/1949 | Strange | D27/127 |
| D157,884 | S | * | 3/1950 | McNair | D27/135 |
| 2,504,597 | A | * | 4/1950 | Sewald, Jr. | 131/235.1 X |
| D201,738 | S | * | 7/1965 | Karbo | D27/135 |
| 3,952,753 | A | * | 4/1976 | Klingler | 131/235.1 |
| 4,534,369 | A | * | 8/1985 | Jenkins | 131/235.1 |
| D303,298 | S | * | 9/1989 | Grant | D27/135 X |
| 4,926,888 | A | * | 5/1990 | Lee | 131/231 |
| 5,259,400 | A | * | 11/1993 | Bruno et al. | 131/231 |

* cited by examiner

*Primary Examiner*—Holly Baynham
(74) *Attorney, Agent, or Firm*—Brinks Hofer Gilson & Lione; Francis E. Marino

(57) CLAIM

The ornamental design for an ashtray, as shown.

DESCRIPTION

FIG. 1 is the front elevation of the ashtray;
FIG. 2 is a left side elevation of the ashtray;
FIG. 3 is a right side elevation of the ashtray;
FIG. 4 is a top plan view the ashtray;
FIG. 5 is a bottom plan view of the ashtray;
FIG. 6 is a back elevation of the ashtray; and,
FIG. 7 is a three-quarter perspective view taken from the front right of the ashtray.

1 Claim, 2 Drawing Sheets

Figure 4:
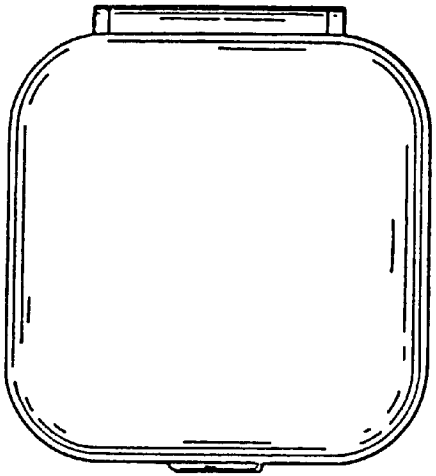
Figure 1:
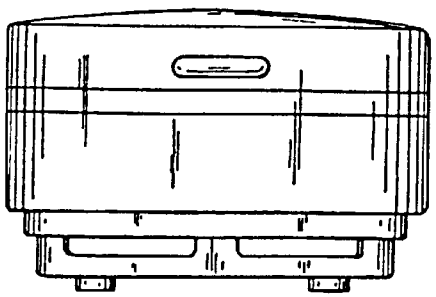
Figure 3:
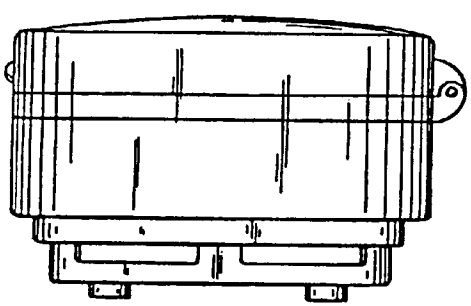
Figure 2:
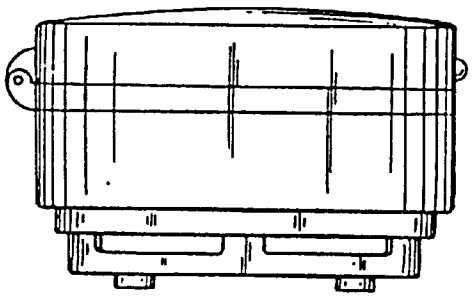
Figure 5:
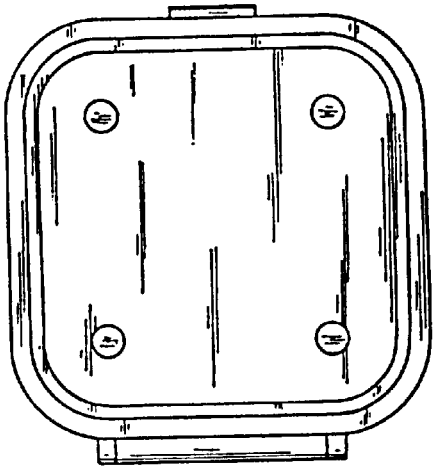
Figure 6:
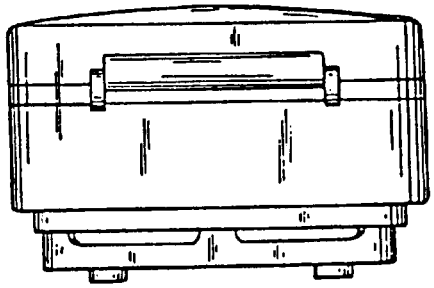

Matter enclosed in heavy brackets [ ] appears in the original patent, but forms no part of this reissue; matter printed in italics indicates the additions made by reissue.

AMENDED

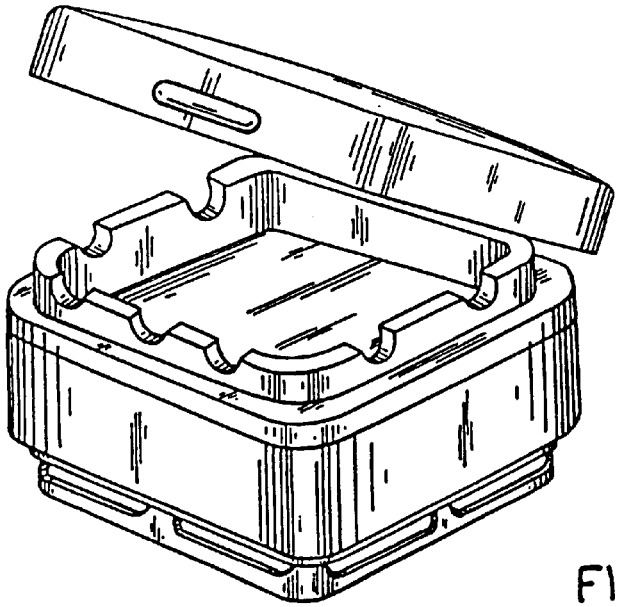
FIG. 7
AMENDED